US011544936B2

(12) United States Patent
Chen et al.

(10) Patent No.: US 11,544,936 B2
(45) Date of Patent: Jan. 3, 2023

(54) IN-PATH OBSTACLE DETECTION AND AVOIDANCE SYSTEM

(71) Applicant: Zoox, Inc., Foster City, CA (US)

(72) Inventors: Yuanyuan Chen, San Mateo, CA (US); Janek Hudecek, Redwood City, CA (US); David Pfeiffer, Foster City, CA (US); James William Vaisey Philbin, Palo Alto, CA (US); Zeng Wang, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 461 days.

(21) Appl. No.: 16/722,931

(22) Filed: Dec. 20, 2019

(65) Prior Publication Data

US 2021/0192234 A1 Jun. 24, 2021

(51) Int. Cl.
*G06V 20/58* (2022.01)
*B60W 50/14* (2020.01)
*B60W 30/09* (2012.01)

(52) U.S. Cl.
CPC .............. *G06V 20/58* (2022.01); *B60W 30/09* (2013.01); *B60W 50/14* (2013.01)

(58) Field of Classification Search
CPC ........ G06V 20/58; B60W 30/09; B60W 50/14
See application file for complete search history.

(56) References Cited

U.S. PATENT DOCUMENTS

| 2013/0253754 | A1 | 9/2013 | Ferguson et al. |
| 2016/0221573 | A1 | 8/2016 | Prokhorov |
| 2018/0341273 | A1 | 11/2018 | Micks et al. |
| 2020/0156630 | A1* | 5/2020 | Schmidt ............ B60W 30/0956 |

FOREIGN PATENT DOCUMENTS

| WO | WO2019033025 A1 | 2/2019 |
| WO | WO2019053695 A1 | 3/2019 |

OTHER PUBLICATIONS

The PCT Search Report and Written Opinion dated Mar. 25, 2021 for PCT application No. PCT/US20/65847, 10 pages.
International Preliminary Report on Patentability for PCT Application No. PCT/US20/65847, dated Jun. 30, 2022.

* cited by examiner

*Primary Examiner* — Michael D Lang
(74) *Attorney, Agent, or Firm* — Lee & Hayes, P.C.

(57) ABSTRACT

A vehicle can include various sensors to detect objects in an environment. In some cases, the object may be within a planned path of travel of the vehicle. In these cases, leaving the planned path may be dangerous to the passengers so the vehicle may, based on dimensions of the object, dimensions of the vehicle, and semantic information of the object, determine operational parameters associate with passing the object while maintaining a position within the planned path, if possible.

20 Claims, 11 Drawing Sheets

IN-PATH OBSTACLE DETECTION AND AVOIDANCE SYSTEM

BACKGROUND

Autonomous vehicles can use sensors to capture data of an environment. To navigate an environment effectively, autonomous vehicles use sensor data to detect objects in the environment to avoid collisions. Segmentation techniques can be used for associating sensor data with objects. Segmentation of three-dimensional data, however, presents particular challenges that can result in erroneous determination that an object is obstructing a path of the autonomous vehicle, causing potentially unsafe reactions by the autonomous vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
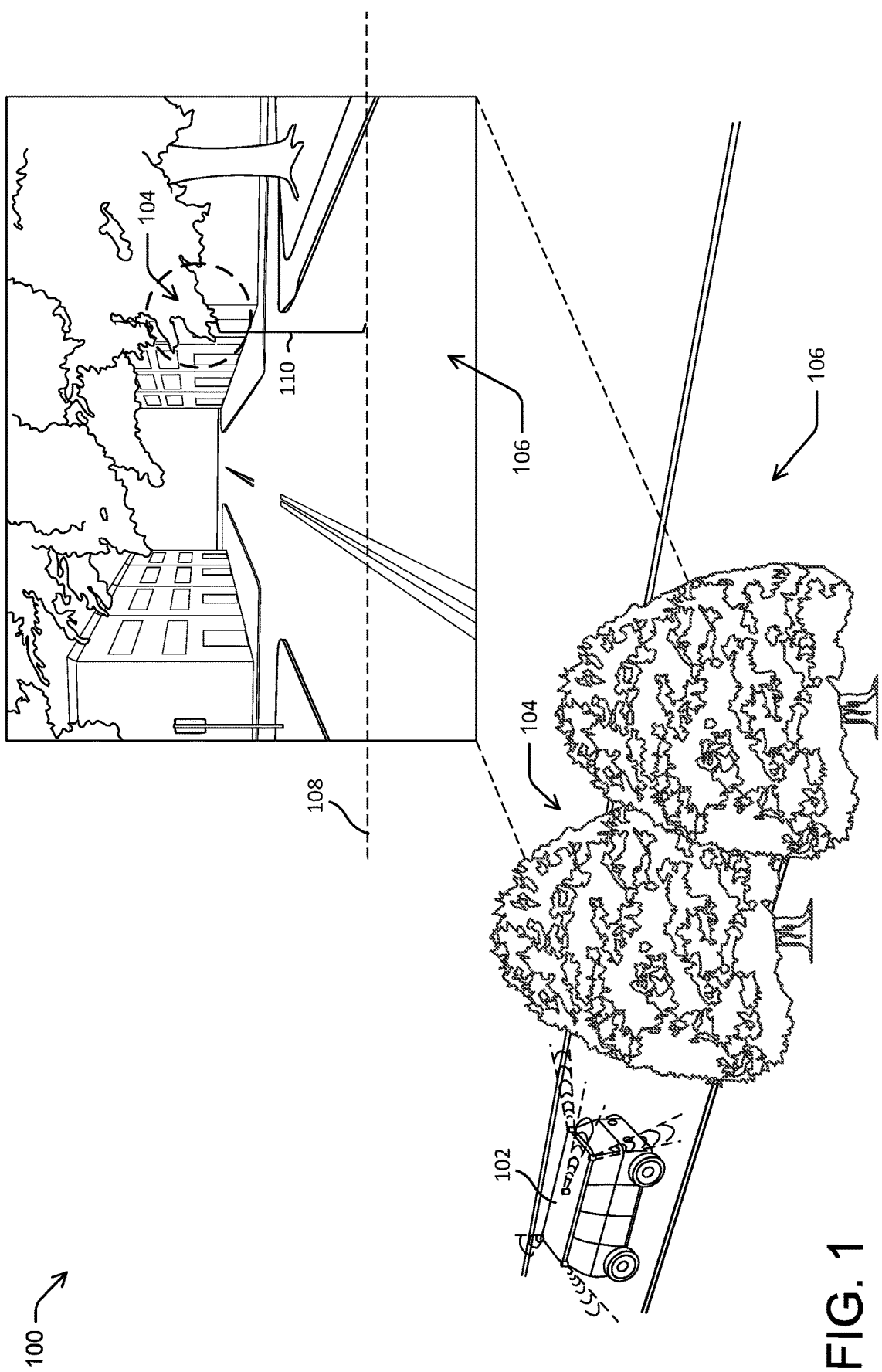
FIG. 1 illustrates a pictorial view of a situation in which a vehicle encounters an object partially obstructing a lane.

This disclosure describes methods, apparatuses, and systems for detecting objects (or portions thereof) nearby or in a path of an autonomous vehicle and determining an appropriate proximity of the vehicle with respect to the detected objects. For example, the system discussed herein may determine an appropriate passing distance to an object on the road, within a planned path of the vehicle, adjacent to or next to the planned path, and/or overhanging the planned path based on a velocity of the vehicle, a type or class of object (e.g., pedestrian, foliage, paper, rock, etc.), a dimensions and/or a position of the object, and dimensions along the surface of the vehicle.

For example, some occurrences that drivers encounter on a sporadic basis include tree limbs and foliage encroaching and/or overhanging the road and small objects along the surface of the road, such as paper/trash, large rocks, or other debris. In these instances, a human driver may be able to visibly assess whether the object will contact any portion of the vehicle and, if so, the risk of damage to the vehicle by potentially contacting the object. In this way, human drivers are able to determine an appropriate passing distance with or without leaving the occupied lane. For example, the driver may avoid contact with a rock by positioning the vehicle to cause the rock to safely pass under the vehicle's chassis and between the wheels. However, traditional autonomous vehicle sensor systems and perception pipelines may detect the rock in the road, identify the rock as an obstacle to be avoided, and to cause the vehicle to drive around the rock completely avoiding the obstacle. In some cases, driving around the rock may actually increase risk of damage and/or collision, as the vehicle may move into another lane (e.g., oncoming lane of traffic), while circumventing the rock could otherwise have been achieved within the lane. The system discussed herein is configured to detect the object (here, the rock), evaluate the object, and determine that the object may be avoided without leaving the vehicle's current lane or path, thereby improving overall safety of autonomous vehicles.

As another illustrative example, foliage often overhangs a road, particularly on poorly maintained or low usage streets. In some cases, a human driver may drive or "brush" the vehicle into the foliage without damaging the vehicle. This type of maneuver is particularly common in tight one-way road situations in which avoidance may not even be possible. In this example, the traditional autonomous vehicle sensor systems and perception pipelines may detect the foliage overhanging the road, identify the foliage as an obstacle to be avoided, and prevent the vehicle from proceeding. In this situation, the vehicle using the traditional system may become stuck if the vehicle is prevented from backing up (e.g., another vehicle has pulled up behind the autonomous system).

In one situation, the vehicle, discussed herein, may determine the foliage is at a distance from/off the ground surface (e.g., a clearance distance or height) that the vehicle may pass under without contacting. In a second situation, the vehicle, discussed herein, may determine that the foliage is of a type or class of object that the vehicle may contact without receiving damage (e.g., the leaves and small limbs will bend to allow the vehicle to pass). In the second situation, the vehicle may select operating parameters (such as a velocity less than 5 miles an hour, 10 miles an hour, 15 miles an hour, etc.) at which the vehicle may proceed through the foliage despite the contact. In a third situation, the vehicle may determine a portion of the vehicle that may contact the foliage. For instance, in the third situation, the vehicle may position itself such that the roof of the vehicle may contact the foliage, while a sensitive sensor located atop the vehicle does not.

As discussed above, the vehicle, discussed herein, is able to make informed decisions related to object avoidance based on the semantic class of the object (e.g., walls or structures, foliage, rocks, vegetation, vehicles, vehicle doors, debris or clutter, bikes, traffic signals or cones, etc.), the characteristics of the class, the position of the object (e.g., height of the object, distance of the object from the ground surface, shape of the object, etc.), and the shape of the vehicle, and the position and fragility of components with respect to the vehicle. This type of object avoidance may allow the vehicle to operate in additional situations or environments, as well as to increase the overall safety of the vehicle, as the vehicle more often maintains its position within the appropriate traffic lane.

FIG. 1 illustrates a pictorial view of a situation 100 in which a vehicle 102 encounters an in-path or in-path or in lane passable object 104. In the current example, the vehicle 102 is driving within a lane 106 of the road and the vehicle captures data representative of object 104 overhanging into the lane 106. In this example, the vehicle 102 may determine that the object 104 does not contact a ground surface, generally indicated by 108. For example, the vehicle 102 may segment and classify the captured data representing the object 104. The vehicle 102 may also generate a bounding box associated with a region of space occupied by the object 104. The vehicle may then determine a maximum distance of the object from the ground surface (e.g., distance between the highest point of the bounding box and the ground) and a minimum distance of the object 104 form the ground surface (e.g., distance between the lowest point of the object and the ground). The vehicle 102 may then determine the object does not contact the ground when the minimum distance is greater than approximately zero.

Since the object 104 does not contact the ground surface 108, the vehicle 102 may determine a minimum distance 110 from the ground surface 108 of the object 104 (e.g., the lowest portion of the object). The vehicle 102 may also store multiple pass distance regions or thresholds (e.g., clearance distances from the vehicle). For example, as discussed in more detail below with respect to FIG. 2, a first pass distance region may define a first distance between the vehicle 102 and an object, such as object 104, that the vehicle 102 may pass the object while traveling under normal operating conditions. Thus, if the distance 110 is greater than the first distance associated with the first pass distance region than the vehicle 102 may pass without changing operating conditions.

The vehicle 102 may also include a second pass distance region defining a second distance between the vehicle 102 and the object 104 at which the vehicle 102 may pass after adjusting an operating parameter, such as reducing a velocity below a first velocity threshold. Again, if the distance 110 is greater than the second distance associated with the second pass distance region, then the vehicle 102 may pass at the first reduced velocity (or under other predetermined operating parameters). The vehicle 102 may also include a third pass distance zone defining a third distance between the vehicle 102 and the object at which the vehicle 102 may pass after adjusting an operating parameter, such as reducing a velocity below a second threshold. Again, if the distance 110 is greater than the third distance associated with the third pass distance zone, then the vehicle 102 may pass at a second reduced velocity. It should be understood that the vehicle may include any number of successive pass distance region or thresholds, and that each of the successive pass distance region may be a reduced distance from the vehicle 102 and include a corresponding reduced velocity.

In some cases, the distance 110 may be less than a third pass distance region. In this example, the third pass distance region may be the final pass distance region such that the third pass distance threshold may be the minimum distance to pass the object 104 without contact. The vehicle 102 may also be configured to determine a class of the object 104. For instance, in the illustrated example, the vehicle may determine the object is of a class that includes foliage and that the foliage class has a low risk of damage upon contact. Alternatively, if the class of the object had been a parked car, the vehicle 102 would have classified the parked car into a class of objects that has a high risk of damage upon contact. In this example, the vehicle 102 may determine that the vehicle 102 may contact the foliage 104, as the vehicle 102 proceeds under the tree. In this case, the vehicle 102 may still decide to proceed as the foliage 104 is of a class of objects that has a low risk of damage (or a risk of damage below a risk threshold) and the contact may be less than a contact threshold. In some cases, the vehicle 102 may compare the risk of contact with a risk of traversing outside of the lane 106. For example, moving into incoming traffic on a busy road may be far more likely to cause damage to the vehicle 102 than contacting the foliage 104.

In some cases, the vehicle may include sub-classes that each include a different risk of contact. For instance, the foliage class may include a sub-class for leaves which have a first risk of damage, a sub-class for branches of less than half an inch which have a second risk of damage, and a third class for branches greater than half an inch. Each sub-class may also include an allowable avoidance distance and/or speed of contact (if contact is deemed necessary). It should be understood, that the number of sub-classes may vary based on class, and that the velocity at which the vehicle 102 contacts the foliage 104 may be determined based on the class/sub-class, the amount of objects 104 that are likely to contact the vehicle 102, and/or a location at which the object 104 is likely to contact the vehicle 102.

Figure 2:
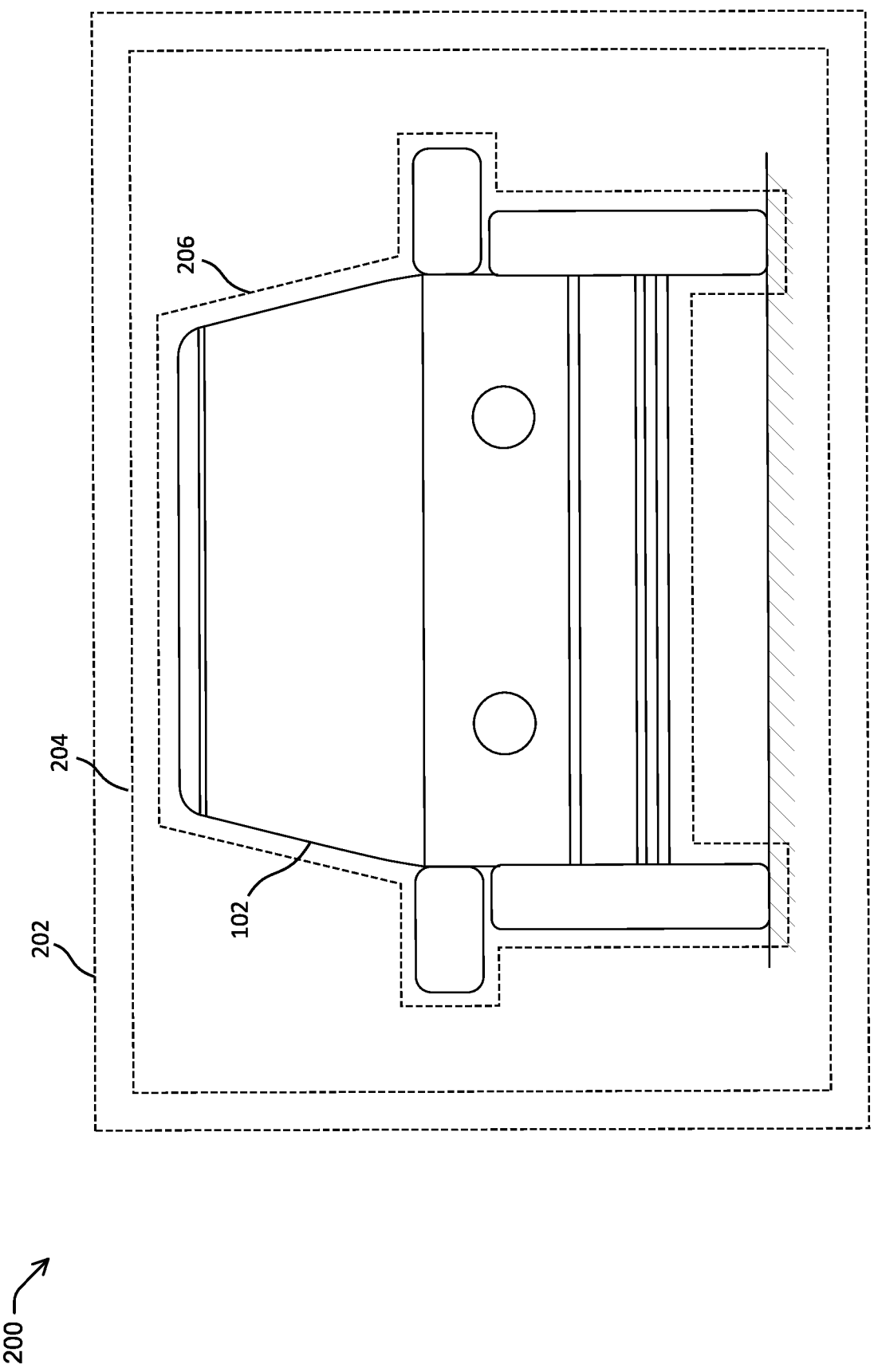
FIG. 2 depicts an example pictorial view illustrating pass distance zones associated with the vehicle of FIG. 1.

FIG. 2 depicts an example pictorial view 200 illustrating the pass distance regions 202, 204, and 206, associated with the vehicle 102 of FIG. 1. As discussed above, the vehicle 102 may store multiple pass distance regions, such as pass distance regions 202-206. Each of the pass distance regions 202-206 may include a bounding area or distance that may indicate a set of operational parameters associated with the vehicle 102 when a distance of an object to the vehicle is within the regions 202-206. In the current example, the vehicle 102 may operate using the parameters associated with the nearest or closest pass distance region that includes an object. Thus, if an object is further from the vehicle 102 than the first pass distance region 202, the vehicle 102 may operate with the parameters associated with the first distance region 202 (e.g., normal operational parameters). If the object is within the first pass distance region 202 but further than the second pass distance region 204, the vehicle 102 may operate under a second set of parameters or conditions. Likewise, if the object is within the second pass distance region 204 but further than the third pass distance region 206, the vehicle 102 may operate under a third set of parameters or conditions. Finally, if the object is within the third pass distance region 206, the vehicle 102 may operate under a fourth set of parameters or conditions (which in some cases may include stopping and/or remote operator control).

In the illustrated example, the first pass distance region 202 and the second pass distance region 204 are represented as rectangular bounding boxes around the vehicle 102. The rectangular bounding box may be determined based on a corresponding distance from an extremity of the exterior of the vehicle 102 (e.g., the most outward position of the vehicle 102 on each side—front, back, left, right, top, and bottom). As such, the first pass distance region 202 and the second pass distance region 204 do not necessarily consider the variations of shape or dimensions of the vehicle 102 itself. In this manner, the vehicle 102 may more quickly make operational decisions using less computational resources when an object is further than the first pass distance region 202 or the second pass distance region 204.

In the current example, the third pass distance region 206 defining a third distance between the vehicle 102 may be defined by a distance from the vehicle's exterior at each point around the exterior. Thus, the vehicle 102 may be able to pass objects protruding into the road from the side but avoiding the rear-view mirrors or extending up from the surface of the road but at a position to avoid the wheels and/or frame.

Figure 3:
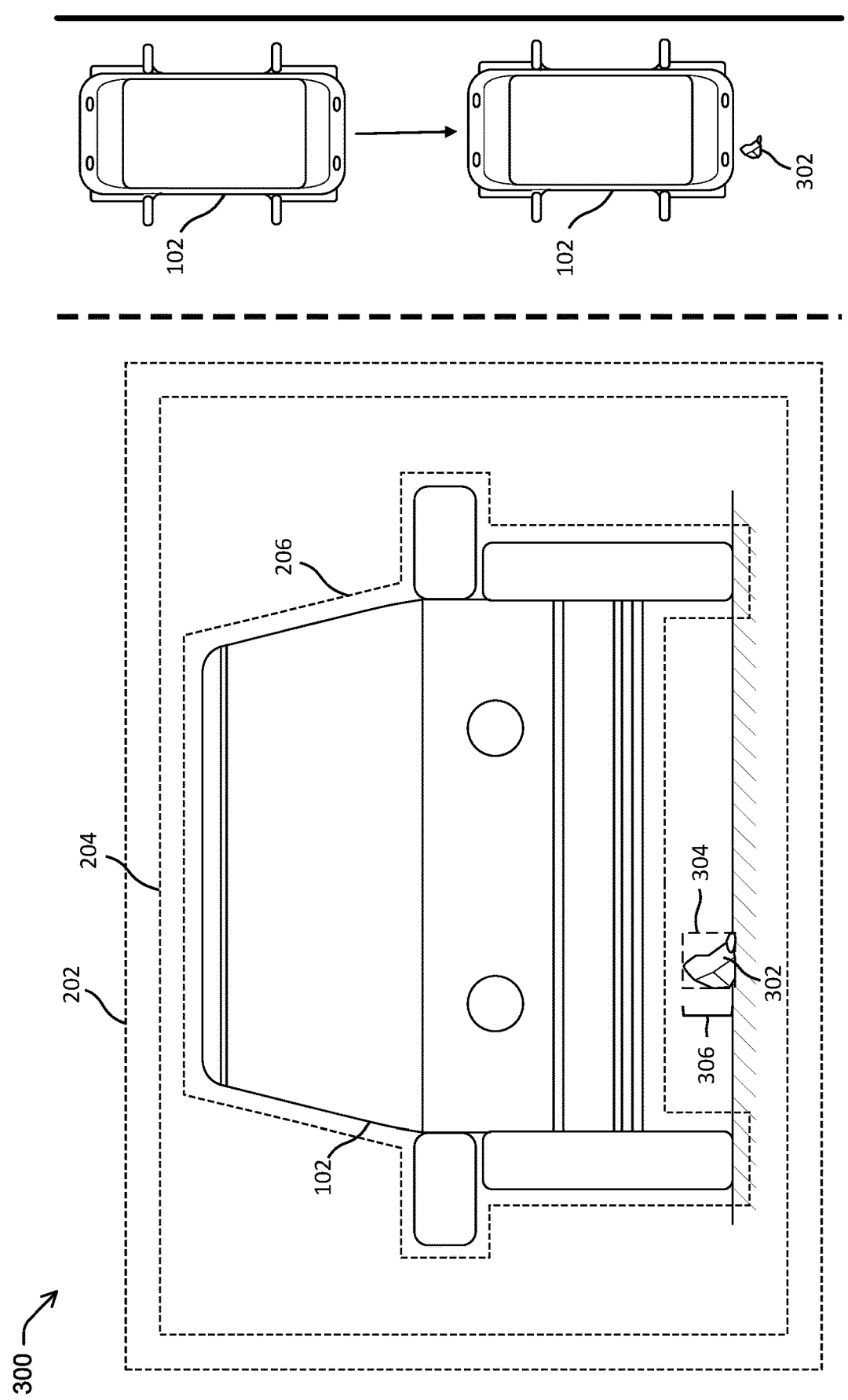
FIG. 3 depicts an example pictorial view illustrating the vehicle of FIG. 1 detecting and passing an object partially obstructing a lane.

FIG. 3 depicts an example pictorial view 300 illustrating the vehicle 102 of FIG. 1 detecting and passing an object 302 partially obstructing a path of the vehicle. In the current example, the vehicle 102 may detect the object 302 along the surface of the road. For example, the vehicle may segment and classify the captured data representing the object 302. The vehicle may also generate a bounding box 304 associated with a region of space occupied by the object 302. The vehicle 102 may then determine a maximum distance 306 of the object 302 from the ground surface (e.g., distance between the highest point of the bounding box and the ground). The vehicle 102 may also determine that while the object 302 is within the first pass distance region 202 and the second pass distance region 204, the object 302 is avoidable based on the third pass distance region 206 being above the maximum distance 306 (e.g., the object 302 does not enter the third pass distance region) at the position of the object 302 with respect to the vehicle 102. For instance, as illustrated, the height of the object 302 allows the vehicle 102 to pass over the object 302 without contact, provided the wheels avoid the object 302. In this example, the vehicle 102 may also determine the semantic class of the object 302 to be a rock or otherwise inanimate object. In other examples, if the object 302 were, say, a small animal, the vehicle 102 may stop operations as the animal may move. However, as the object 302 is an inanimate and can safely pass under the chassis of the vehicle 102, the vehicle 102 may proceed to drive over the rock 302 but at a reduced velocity (or operating under the third operation parameters). In some example, the bounding box 304, the position of the object 302, and the height of the object 306 may be provided to a planner system of the vehicle 102 and the planner system may alter the planned path of the vehicle and/or the operational parameters.

Figure 4:
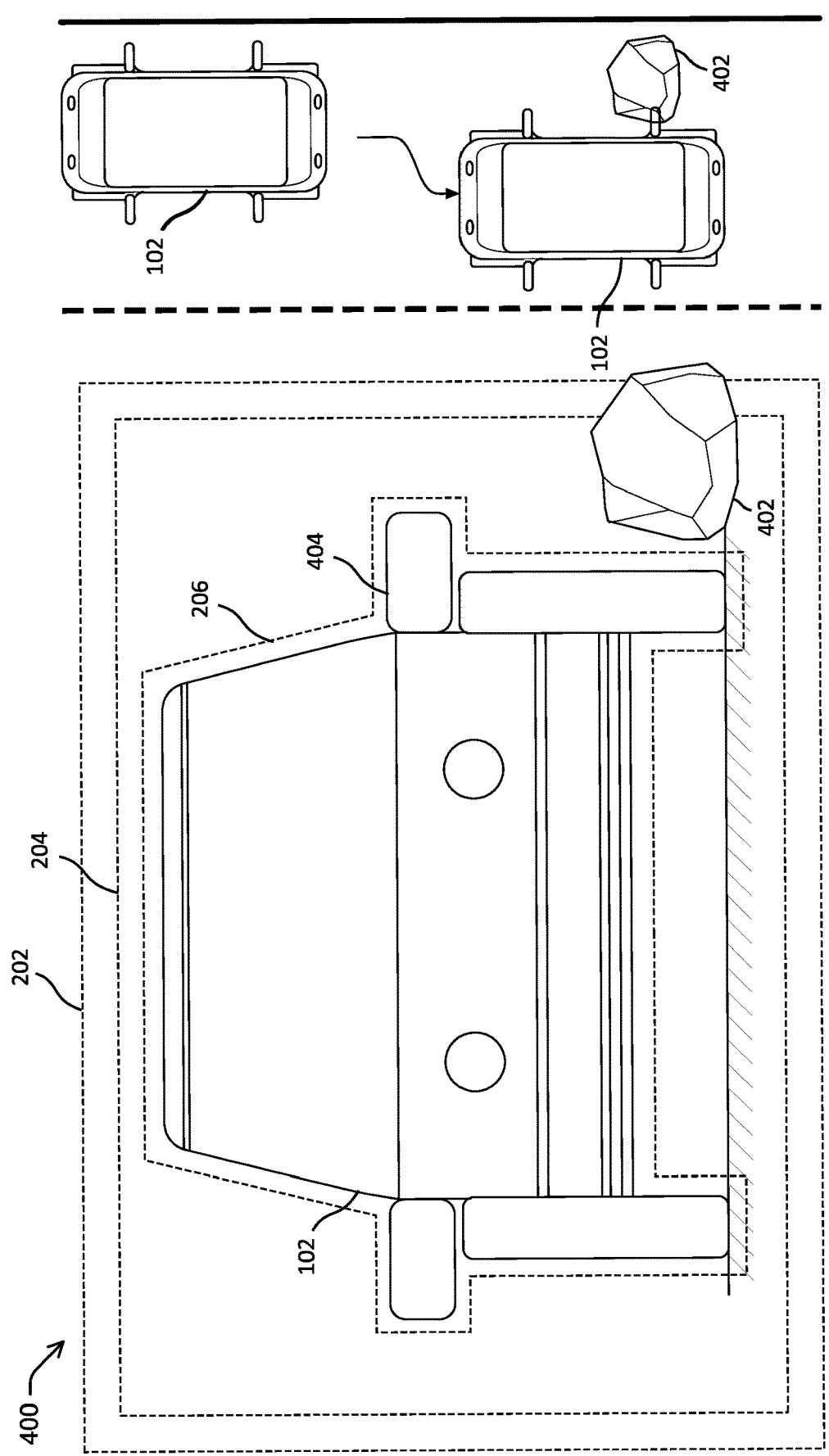
FIG. 4 depicts an example pictorial view illustrating the vehicle of FIG. 1 detecting and passing an object partially obstructing a lane.

FIG. 4 depicts an example pictorial view 400 illustrating the vehicle 102 of FIG. 1 detecting and passing an object 402 partially obstructing the lane. In the current example, the vehicle 102 may detect the object 402 along the surface of the road. In this case, the vehicle 102 may again determine a maximum distance from the ground (e.g., a height) of the object 402. However, unlike the example of FIG. 3, the vehicle 102 may determine that the object 402 is too tall (e.g., has a height) that would contact the bottom of the vehicle 102 if the vehicle attempted to pass over. In this case, the vehicle 102 may determine that the vehicle 102 is unable to avoid the object 402 while staying in the path of the vehicle according to the first pass distance threshold 202 and the second pass distance threshold 204. However, the vehicle 102 may determine that, while the object 402 may not be passable under the frame or between the wheels, the object 402 may pass under a rear-view mirror or other protruding sensor that extends from the exterior of the vehicle 404 while the vehicle maintains a position within the planned path of the vehicle based on the dimensions of the third pass distance threshold 206, the dimensions of the object 402, and the width of the path. Again, the vehicle 102 may first determine the semantic class of the object 402 to be a rock prior to the object 402 entering the pass distance thresholds 202 and 204.

Figure 5:
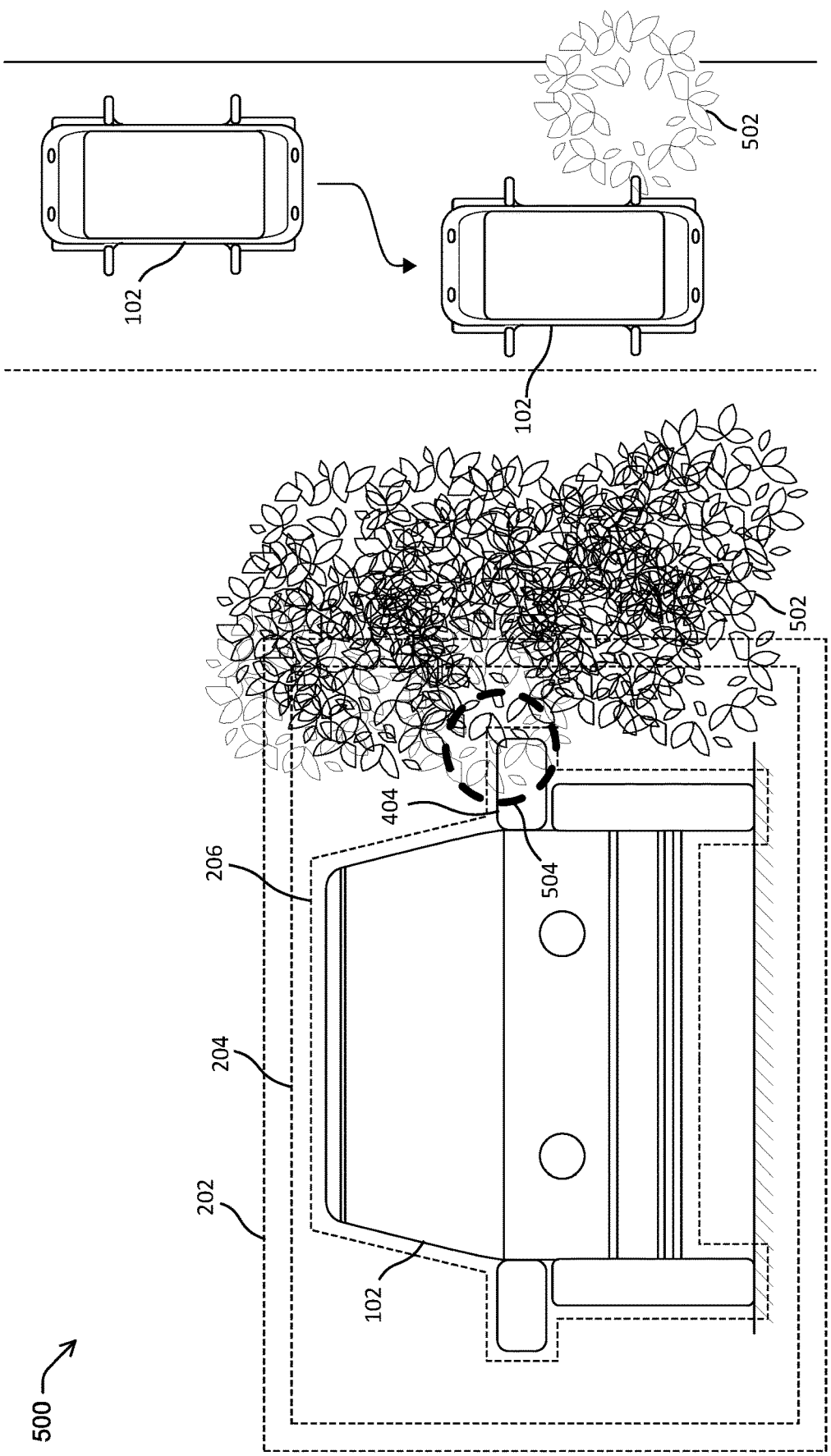
FIG. 5 depicts an example pictorial view illustrating the vehicle of FIG. 1 detecting and passing an object partially obstructing a lane.

FIG. 5 depicts an example pictorial view 500 illustrating the vehicle 102 of FIG. 1 detecting and passing an object 502 partially obstructing the path. In the current example, the vehicle 102 may determine that the object 502 extends into the path at a distance that would cause the object 502 to enter first pass distance threshold 202, the second pass distance threshold 204, and the third pass distance threshold 206. In this example, the vehicle 102 may also determine that the semantic class of the object is foliage (e.g., a bush). For instance, the class or sub-class may be leaves and small branches that have a low risk to damage the vehicle 102. The vehicle 102 may also determine that there is a large amount of oncoming traffic and crossing a lane line would be unadvisable. For example, the vehicle or a planning system may assign "costs" to different trajectories/actions including contacting the object 502 and driving into the oncoming traffic. Based on the cost, the vehicle 102 may then decide to contact the object 502. In some cases, deviating from a most direct route may have a first cost, braking or swerving may have a second cost (such as based on passenger discomfort), etc. In this example, the vehicle 102 may generate multiple candidate trajectories, compute a cost for each, and then choose the lowest cost trajectory as the planned path of the vehicle 102.

In this situation, the vehicle 102 may, based at least partly on the semantic classification and a determined area of contact 504 (e.g., the rear-view mirror or protruding sensor 404), determine that the vehicle 102 may proceed despite the contact with the foliage 502. In this example, the vehicle 102 may operate within a confined set of parameters, such as below a velocity threshold.

Figure 6:
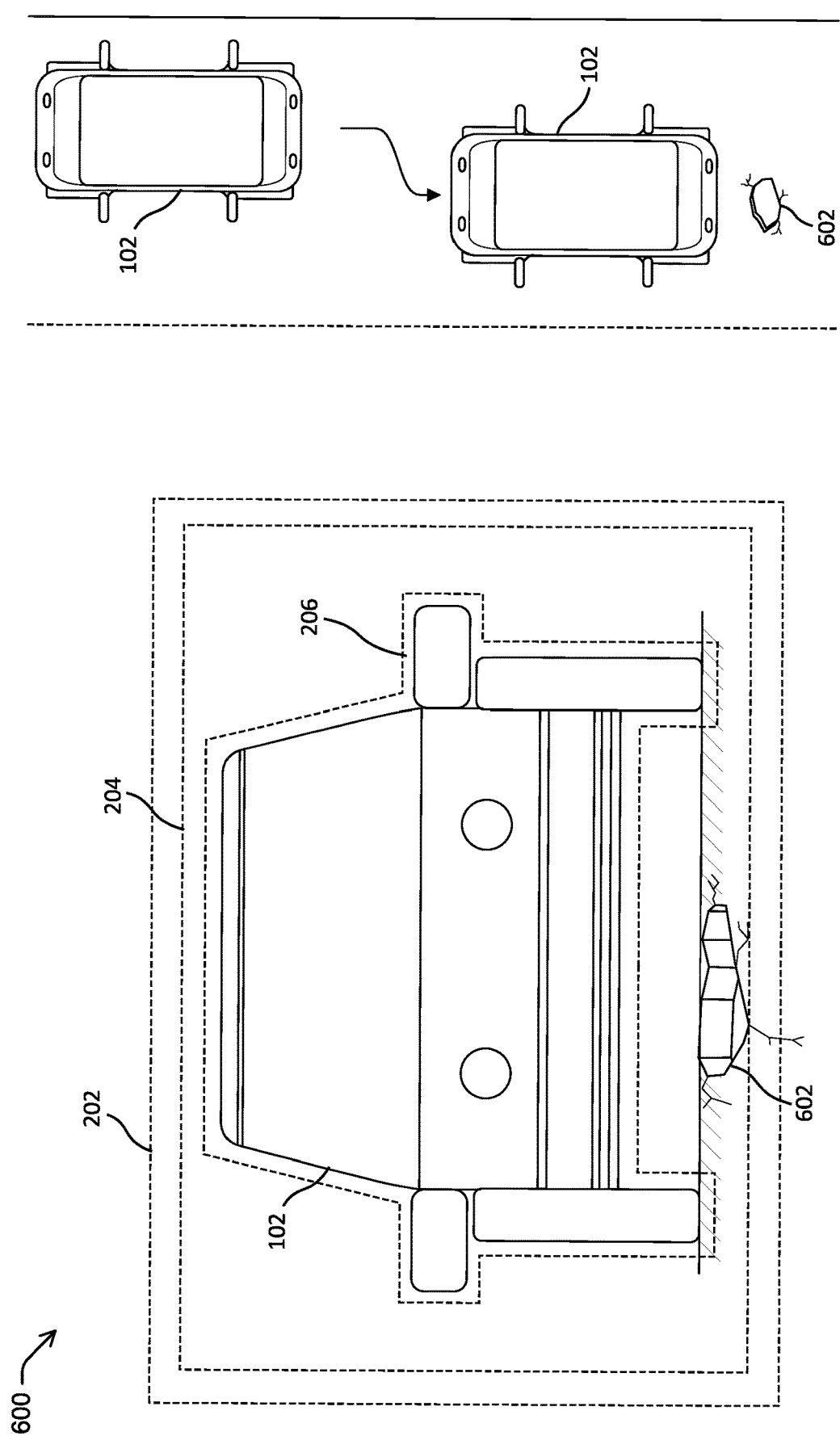
FIG. 6 depicts an example pictorial view illustrating the vehicle of FIG. 1 detecting and passing over an object on the ground.

FIG. 6 depicts an example pictorial view 600 illustrating the vehicle 102 of FIG. 1 detecting and passing over an object 602 on the ground. In the current example, the vehicle 102 may detect the object 602 along the surface of the road or below the ground surface. In this case, the vehicle 102 may determine a maximum distance from the ground (e.g., a depth) of the object 602. The vehicle 102 may also determine the depth to be greater than a depth threshold that the vehicle 102 may drive its wheels over. The vehicle 102 may also determine that the object 602 is avoidable based on the third pass distance threshold 206 (e.g., the object 602 may pass between the wheels the same way as the rock 302 of FIG. 3). In this example, the vehicle 102 may also determine the semantic class of the object 602 to be a pothole or obstruction with the ground surface itself. However, as the object 602 is an inanimate and can safely pass between the wheels of the vehicle 102, the vehicle 102 may proceed to drive over the object 602 but at a reduced velocity (or operating under the third operation parameters).

In the examples of FIGS. 4-6, the vehicle 102 may determine the object may be passed within the lane based on the third pass distance zone 206 as discussed above. However, it should be understood that, in each of these examples, the vehicle 102 may adjust a position while staying within the lane to properly avoid the object as shown.

Figure 7:
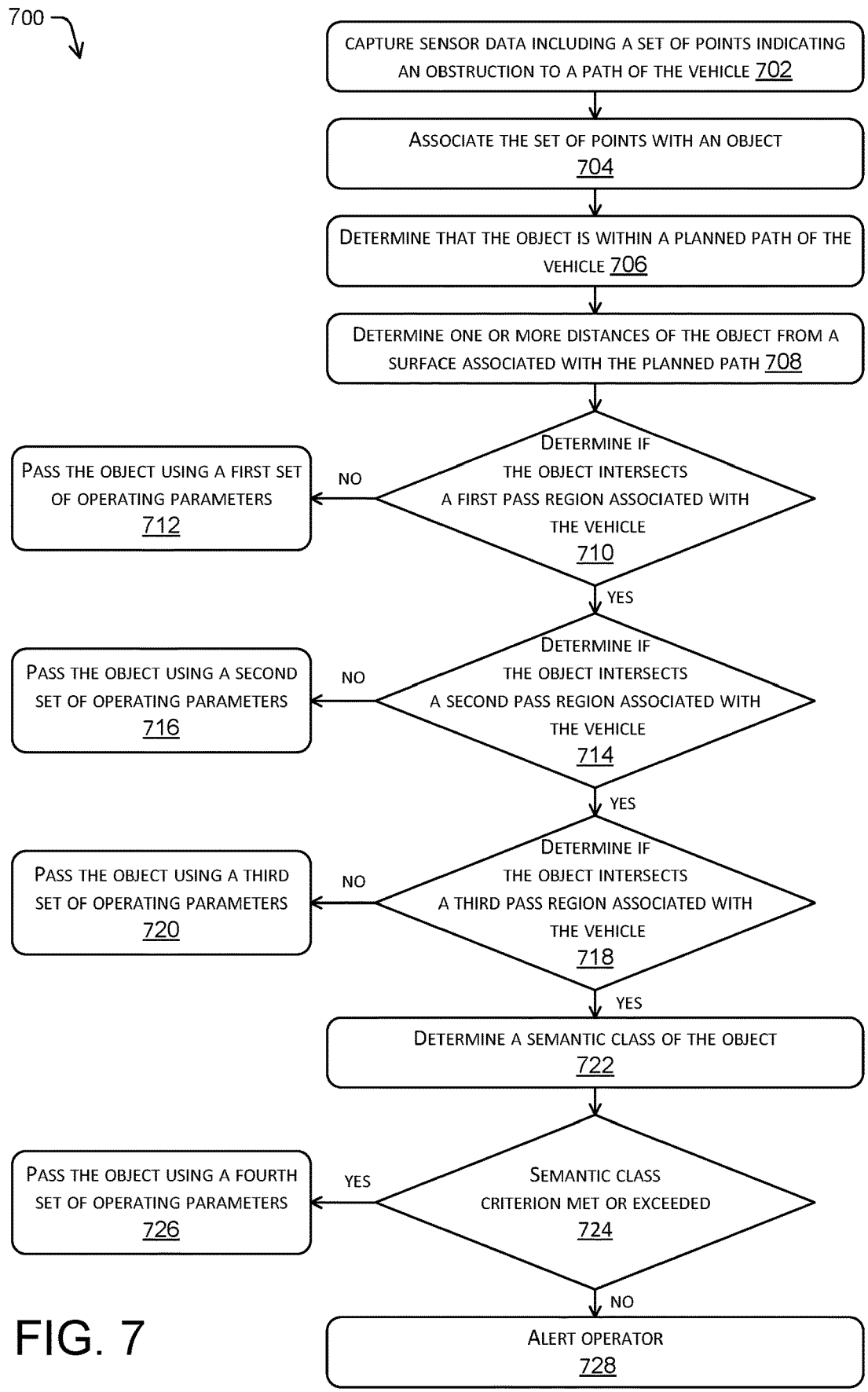
FIG. 7 depicts an example process for detecting and passing an object partially obstructing a path of a vehicle.
Figure 8:
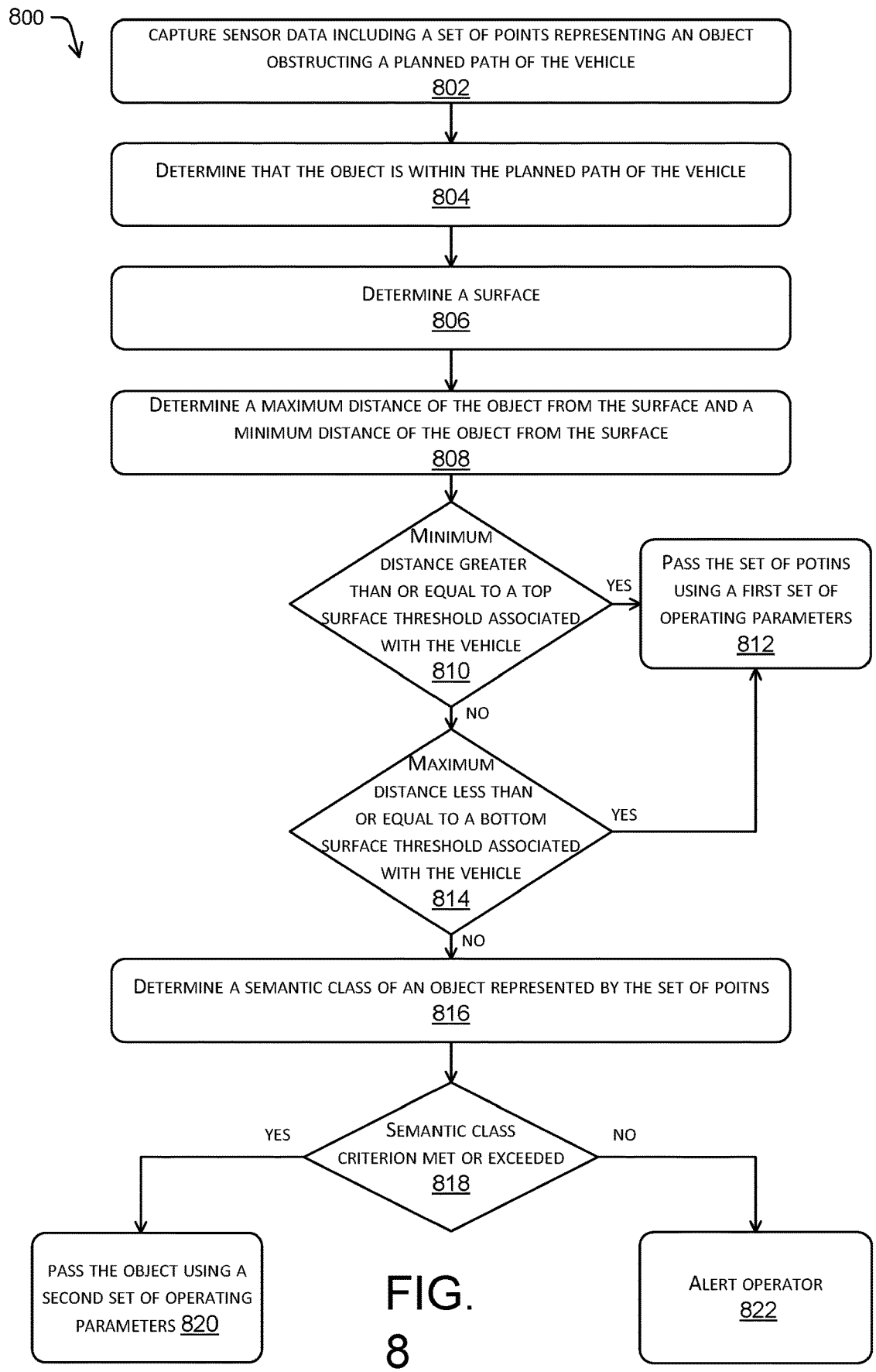
FIG. 8 depicts another example process for detecting and passing an object partially obstructing a path of a vehicle.

FIGS. 7-8 are flow diagrams illustrating example processes associated with the determining operating parameters of a vehicle with respect to an object in a path or lane of the vehicle of FIGS. 1-6. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures, or environments.

FIG. 7 depicts an example process 700 for detecting and passing an object partially obstructing a path of the vehicle. A vehicle may determine a path within a lane of operation to avoid an object within the path based on the semantic class of the object, the characteristics of the class, the position of the object with respect to the path and/or a ground surface, the shape or dimensions of the object, and the shape or dimensions of the vehicle. As discussed above, this type of object avoidance may allow the vehicle to operate in additional situations or environments, as well as to increase the overall safety of the vehicle as the vehicle more often maintains a position within the appropriate traffic lane.

At 702, the vehicle may capture sensor data including a set of points indicating an obstruction to a path of the vehicle. For example, the vehicle may capture the sensor data including LIDAR (light detection and ranging) data, RADAR data, SONAR data, image data (red-green-blue, infrared, intensity, depth, etc.), audio data, infrared data, location data, depth data, or any combination thereof.

At 704, the vehicle may associate the set of points with an object. For instance, the vehicle may process the captured sensor data using various machine learned models and/or neural networks to determine the presence of the object. For example, the object may be detected by the processes and techniques discussed in U.S. application Ser. No. 15/963,833, which is herein incorporated by reference, in its entirety. In one specific example, the vehicle may perform segmentation on the object and/or identify a bounding box region around the object to define the object extremities.

At 706, the vehicle may determine that the object is within a planned path of the vehicle. For instance, the vehicle may determine based at least in part on a position of the set of points or object with respect to a stored scene or map of the physical environment that the object is located along the path the vehicle is currently operating within.

At 708, the vehicle may determine one or more distances of the object from a surface associated with the planned path. For example, the vehicle may identify the ground surface and determine a maximum distance of the object from the ground surface (e.g., the top of the object) and a minimum distance of the object from the ground surface (e.g., the bottom of the object). In some cases, the vehicle may determine a ground plane associated with the ground surface as discussed in U.S. application Ser. No. 16/698,055, or as discussed in U.S. application Ser. No. 15/622,905, both of which are herein incorporated by reference, in their entirety.

At 710, the vehicle may determine if the object intersects a first pass region associated with the vehicle based in part on the distances. In some cases, the first pass region may be a first predetermined distance from a particular point along each side of the vehicle (e.g., left, right, top and bottom). In some cases, the first predetermined region may be uniform on each side of the vehicle while in other cases the first predetermined distance may vary. For example, the first pass region may be further from the top of the vehicle than along the sides of the vehicle. In one example, the vehicle may determine if the vehicle is able to drive under the object by determining if the minimum distance is greater than the first pass region along the top surface of the vehicle. Likewise, in another example, the vehicle may determine if the vehicle is able to drive over the object by determining if the maximum distance is greater than the first pass region along the bottom surface of the vehicle. If the object does not intersect the first pass region, the process 700 may proceed to 712 and, at 712, the vehicle may proceed to pass the object using a first set of operating parameters (e.g., normal operating parameters). In some examples, a planning system of the vehicle may receive the object data and determine the operational parameters and/or update the planned path of the vehicle based at least in part on the object. However, if the object does intersect the first pass region, the process 700 may proceed to 714.

At 714, the vehicle may determine if the object intersects a second pass region associated with the vehicle based in part on the distances. Similar to the first pass region, the second pass region may be a second predetermined distance from the particular point along each side of the vehicle (e.g., left, right, top and bottom).

In the current example, the second predetermined distance may be less than the first predetermined distance associated with the first pass region (e.g., an acceptable distance for passing according to the second pass region is closer than an acceptable distance for passing according to the first pass distance region). In one example, the vehicle may determine if the vehicle is able to drive under the object by determining if the minimum distance is greater than the second pass region along the top surface of the vehicle. Likewise, in another example, the vehicle may determine if the vehicle is able to drive over the object by determining if the maximum distance is greater than the second pass region along the bottom surface of the vehicle. If the object does not intersect the second pass region, the process 700 may proceed to 716 and, at 716, the vehicle may proceed to pass the object using a second set of operating parameters. The second set of operating parameters may include, for instance, a reduced velocity or alter the planned path. However, if the object intersects the second pass region, the process 700 may proceed to 718.

At 718, the vehicle may determine if the object intersects a third pass region associated with the vehicle based in part on the distances. Unlike the first pass region or the second pass region, the third pass region may be a third predetermined distance from a plurality of points along each side of the vehicle (e.g., left, right, top and bottom), such that the third pass region reflects the shape of the vehicle itself. In the current example, the third predetermined distance may be less than the first predetermined distance and the second predetermined distance (e.g., an acceptable distance for passing according to the third pass region is closer than the acceptable distance for passing according to the first pass distance region or the second pass region). In one example, the vehicle may determine if the vehicle is able to drive under the object by determining if the minimum distance is greater than the third pass region along the top surface of the vehicle. In another example, the vehicle may determine if the vehicle is able to drive over the object by determining if the maximum distance is less than the third pass region along the bottom surface of the vehicle. In some cases, the vehicle may determine a pass area, such as a location with respect to the vehicle, to drive over the object. For instance, the vehicle may determine that the object would fit under a portion of the vehicle (as the third pass distance threshold corresponds to the shape of the vehicle) and align the portion with the object. If the object does not intersect the third pass distance threshold, the process 700 may proceed to 716 and, at 716, the vehicle may proceed to pass the object using a third set of operating parameters. The third set of operating parameters may include, for instance, a further reduced velocity than the second set of operating parameters. However, if the object intersects the second pass distance threshold, the process 700 may proceed to 722.

At 722, the vehicle may determine the semantic class of the object. For example, the vehicle may perform classification on the object using various machine learned models and/or neural networks. In some cases, the vehicle may also assign a subclass to the object. In some examples, the vehicle may perform classification on the set of points using various machine learned models and/or neural networks. For instance, the one or more neural networks may generate any number of learned inferences or heads, such as semantic class head, direction to object instance center head, as well as other learned output heads. In some cases, the neural network may be a trained network architecture that is end-to-end. In one example, the semantic class estimation may include segmenting and/or classifying extracted deep convolutional features into semantic data (e.g., rigidity, hardness, safety risk, risk of position change, class or type, potential direction of travel, etc.). In other cases, the semantic class of the object may be determined as discussed in U.S. application Ser. No. 15/820,245, which is herein incorporated by reference, in its entirety.

At 724, the vehicle may determine if a semantic class criterion is met or exceeded. For example, the vehicle may store various class characteristics associated with each class and may determine, based on the class characteristics, if the vehicle may proceed even though the object is within the third pass distance threshold. For instance, if the object is of a class is inanimate or not, is likely to damage the vehicle (e.g., leaves, paper, trash, and small twigs may not but a bike or scooter may) and an amount of contact between the vehicle and the object is less than a contact threshold (e.g., less than 1.0 inch, less than 2.0 inches or less than 5.0 inches of contact) than the process 700 may advance to 726 and the vehicle may proceed to pass the object using a fourth set of operating parameters. In some cases, the fourth set of operating parameters may be more restrictive, such as an even further reduced velocity than the third set of operating parameters. If the semantic class does not meet or exceeds the proceed criteria (such as the object is animate, too hard, or rigid, etc.) than the process 700 moves to 728 and the vehicle alerts an operator (such as a remote vehicle operator).

At 728, the vehicle may alert the remote operator and the remote operator may be able to control or otherwise steer the vehicle using image data generated by the vehicle and a remote control or operating device. In this manner, the remote operator may make the same informed decision on the same type of information related to the object within the planned path as a human driver would.

FIG. 8 depicts another example process 800 for detecting and passing an object partially obstructing a path of the vehicle. As discussed above, an autonomous vehicle may determine a path (such as within a lane of operation) to avoid an object within the lane based on the semantic class of the object, stored or known information associated with the class, the position of the object with respect to the path of the vehicle and/or one or more planes associated with the physical environment, the dimensions of the object, and the dimensions of the vehicle. As discussed above, this type of object avoidance may allow the vehicle to operate in additional situations or environments, while also increasing the overall safety of the vehicle, as the vehicle more often stays within the appropriate traffic lane.

At 802, the vehicle may capture sensor data including a set of points representing an object obstructing a planned path of the vehicle. For example, the vehicle may include various sensor systems such as sensor systems configured to capture LIDAR data, RADAR data, SONAR data, image data, audio data, location data, depth data, or any combination thereof.

At 804, the vehicle may determine that the object is within the planned path of the vehicle. For example, the vehicle may associate the set of points with a map or scene of the physical environment. The vehicle may determine that at least a portion of the set of points is within a planned path of the vehicle based on a position of the set of points within the map or scene. In some cases, the vehicle may associate, segment, and classify the set of points to identify an object and position the object within the stored scene representative of the environment. In some examples, the vehicle may generate a top-down view or map of the physical environment and the planned path, such as shown in FIGS. 2-6. In other examples, the vehicle may also determine a bounding box or region associated with the object and determine if the bounding box intersects with a corridor (e.g., a three-dimensional representation of the planned path). The vehicle may then utilize the position of the object (or bounding box) and/or object geometries to determine that the object is within the path of the vehicle.

In another example, the vehicle may determine that at least a portion of the set of points (or bounding box) is within the corridor or planned path of the vehicle based on an intersection between the points or bounding box and the corridor. For instance, the vehicle may identify the ground surface and the left and right side of the planned path (e.g., vertical planes bounding the corridor), determine that the object is positioned between the left side and the right side of the corridor. As discussed herein, left and right side of the corridor is variable, such as based on the velocity of the vehicle and an angle of travel.

At 806, the vehicle may determine a surface associated with the physical environment or the corridor. For instance, the surface may be a horizontal ground plane associated with the ground surface or left or right side of the corridor.

At 808, the vehicle may determine a maximum distance of the object from the surface (e.g., the ground surface) and a minimum distance associated with the object from the surface. For example, the vehicle may determine a height of the object based on the maximum distance associated with the object from the ground surface. For example, if the minimum distance is approximately zero then the object represented by the object is positioned along the ground plane and the maximum distance is equal to the height of the object.

Similarly, the vehicle may determine an offset from the ground surface (e.g., clearance below the object represented by the set of points) based on the minimum distance between the ground plane and the object. For instance, if the minimum distance is greater than approximately zero, than the object represented is an overhanging object and the minimum distance represents the clearance under the overhang.

In other examples, such as if the plane is a vertical side plane of the corridor of the planned path, the vehicle may utilize the maximum distance to determine a first encroachment distance from the right side of the corridor of the vehicle and minimum distance to determine a second encroachment distance from the other side of the corridor in a manner similar to the ground surface. In some specific instances, the vehicle may determine a maximum distance and a minimum distance from both of the vertical side surface of the corridor.

At 810, the vehicle may determine if the minimum distance is greater than or equal to a top surface threshold associated with the vehicle (e.g., the bottom of the object is above a predefined distance over the top surface of the vehicle). For instance, if the surface was a ground the vehicle may determine if the vehicle may safely pass under the overhang. For instance, as discussed above with respect to FIG. 7, the vehicle may compare various pass distance regions to the minimum distance to determine operational parameters that may be used when passing the overhanging object. It should also be understood that the regions may vary based on dimensions of the top surface of the vehicle and/or be a fixed distance from a point along the top surface of the vehicle.

If the minimum distance is greater than or equal to the top surface threshold (e.g., one or more of the pass distance regions discussed above), the process 800 may proceed to 812 and the vehicle may pass the object, as the object is an overhang (e.g., not along the surface of the road) and the vehicle has sufficient clearance to pass without contact. In some cases, a planning system may receive the clearance information and/or the first set of operational parameters and plan a trajectory associated with passing the object based on the first set of operational parameters and the location of the object within the planned path. In the current example, at 812, the vehicle (or the vehicle planning system) may utilize a first set of operational parameters when passing the object, such as normal operating parameters. In some examples, such as the example of FIG. 7, the first set of operational parameters may be dependent on the pass distance region or the nearness of the object to the vehicle. However, if the minimum distance is not greater than or equal to the top surface threshold, the process 800 advances to 814.

At 814, the vehicle may determine if the maximum distance is less than or equal to a bottom surface threshold associated with the vehicle (e.g., the top of the object is below a predefined distance beneath the bottom surface of the vehicle). For instance, if the surface was a ground the vehicle may determine if the vehicle may safely pass over the object along the surface of the road. In some examples, as discussed above with respect to FIG. 7, the vehicle may compare various pass distance regions to the maximum distance to determine operational parameters that may be used when passing the surface object. It should also be understood that the regions or thresholds may vary based on dimensions of the bottom surface of the vehicle and/or be a fixed distance from a point along the top surface of the vehicle. For instance, an object passing under the protruding sensors may have a larger bottom surface threshold than an object passing under the chassis of the vehicle. In some cases, the vehicle may also determine a width of a surface object passing between the wheels to ensure that the object has enough clearance for the vehicle to pass over the object without impacting the wheels.

If the maximum distance is less than or equal to the bottom surface threshold (e.g., one or more of the pass distance regions discussed above), the process 800 may proceed to 812 and the vehicle may pass the object, as the object is a small surface object and the vehicle has sufficient clearance to pass without contact. However, if the maximum distance is not greater than or equal to the bottom surface threshold, the process 800 advances to 816.

At 816, the vehicle may determine the semantic class of an object represented by the set of points. In some examples, the vehicle may perform classification on the set of object points using various machine learned models and/or neural networks. For instance, the one or more neural networks may generate any number of learned inferences or heads, such as semantic class head, direction to object instance center head, as well as other learned output heads (such as target extent, target azimuth, target velocity, object boundary box, etc.). In some cases, the neural network may be a trained network architecture that is end-to-end, for instance with Stochastic Gradient Descent. In some cases, appropriate truth outputs in the form of image maps may include semantic per-pixel classification (foliage, rock, vehicle, animal, trash, etc.) and bounding box representations. In some examples, the semantic class estimation may include segmenting and/or classifying extracted deep convolutional features into semantic data (e.g., rigidity, hardness, safety risk, risk of position change, class or type, potential direction of travel, etc.).

In some cases, the semantic classification may be performed prior to or in parallel with determining the maximum and minimum distances from the plane. For example, in some cases, such as if the object is classified as paper or plastic trash, the vehicle may ignore the set of points as the object does not pose a risk of damage upon contact and may be likely to move (e.g., blow in the wind) and, therefore, computational resources may be saved.

At 818, the vehicle may determine if the semantic class criterion is met or exceeded. For example, the vehicle may include types of classes (e.g., paper, plastic, other soft trash, leaves, small branches, etc.) that are deemed safe classes and pose a risk of damage below a threshold level. In other examples, the vehicle may compare characteristics of the class, such as rigidity, hardness, to various criteria or thresholds to determine if the object is safe. In one particular example, the criteria may include a risk of damage upon contact or various scales of risk of damage upon contact based on, for instance, velocity of the vehicle. In the current example, if the semantic class criterion is met or exceeded, the process 800 moves to 820 and, at 820, the vehicle passes the object using a second set of operational parameters. If, however, the semantic class criterion is not met or exceeded, the process 800 moves to 822 and the vehicle may alert an operator. For instance, the vehicle may notify an operator within the vehicle and/or at a remote location via one or more networks. In this manner, the vehicle may be manually operated around the object, thereby ensuring the safety of the passengers.

Figure 9:
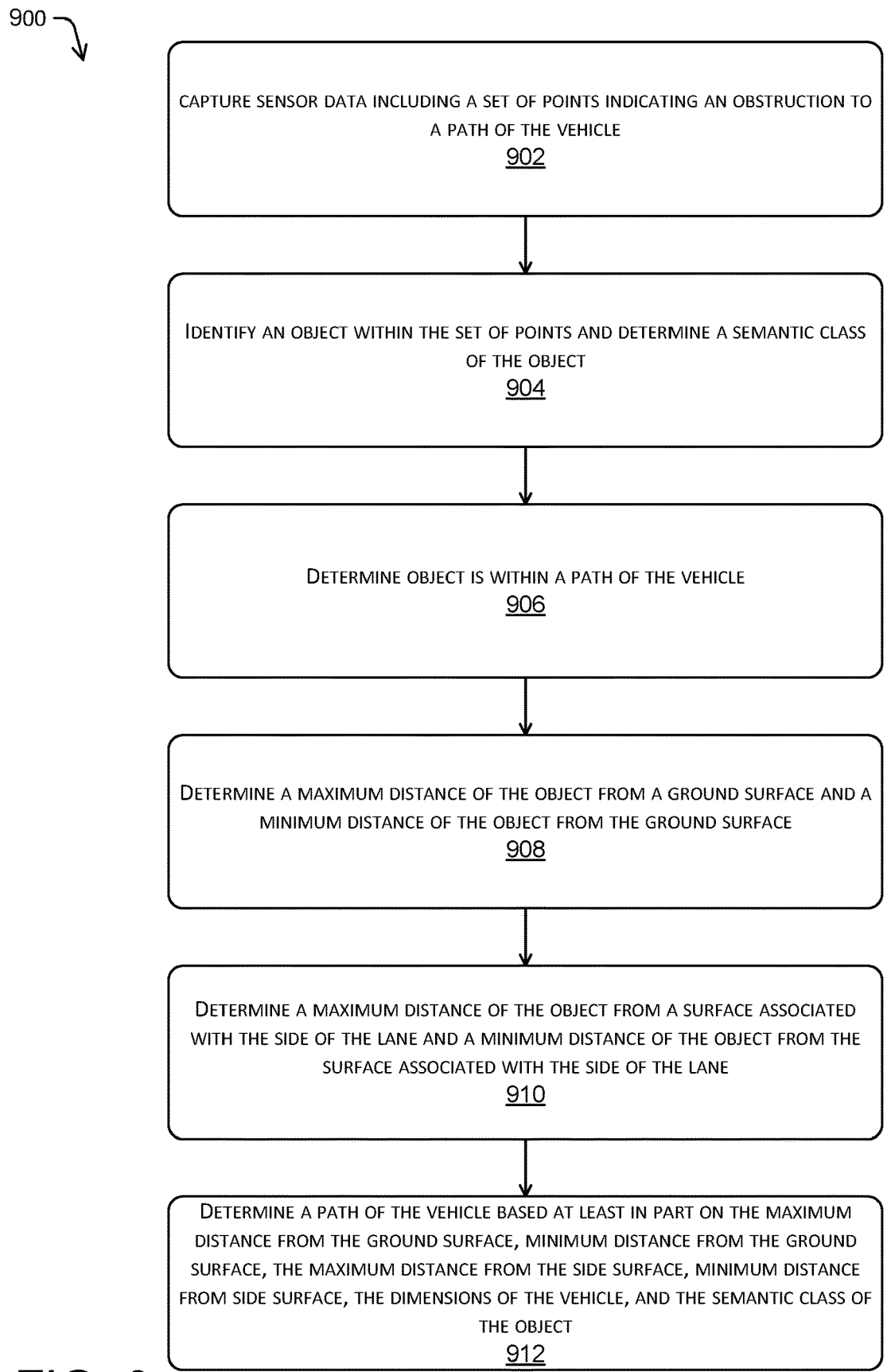
FIG. 9 depicts another example process for detecting and passing an object partially obstructing a path of a vehicle.

FIG. 9 depicts another example process 900 for detecting and passing an object partially obstructing a path of the vehicle. As discussed above, an autonomous vehicle may determine a path within a lane of operation to avoid an object within the lane based on the semantic class of the object, the characteristics of the class, the position of the object with respect to the lane and/or one or more planes associated with the physical environment, the dimensions of the object, and the dimensions of the vehicle. As discussed above, this type of object avoidance may allow the vehicle to operate in additional situations or environments, while also increasing the overall safety of the vehicle, as the vehicle more often stays within the appropriate traffic lane.

At 902, the vehicle may capture sensor data including a set of points indicating an obstruction to a path of the vehicle. For example, the vehicle may include various sensor systems such as may include sensor systems configured to capture LIDAR data, RADAR data, SONAR data, image data, audio data, location data, depth data, or any combination thereof.

At 904, the vehicle may identify an object within the set of points and determine the semantic class of the object. For example, the vehicle may perform techniques such as object detection, filtering, classification, segmentation, feature extraction, sparse features representation, pattern detection, white space detection, pixel correlation, feature mapping, etc. to identify the object within the set of points and position the object with respect to a map or scene of the physical environment. In some cases, the object detection, the classification, and the segmentation may include machine learned models and/or neural networks. The one or more neural networks may generate any number of learned inferences or heads.

At 906, the vehicle may determine that the object is within a path of the vehicle. For example, the vehicle may determine that at least a portion of the object within a region of the lane the vehicle is occupying or within a path of the vehicle. In some cases, the vehicle may determine vertical side planes associated with the edge of the lane as well as a ground plane associated with the surface of the road. The vehicle may then determine that at least a portion of the object is within the space defined by the identified planes.

At 908, the vehicle may determine a maximum distance of the object from the ground surface and a minimum distance of the object from the ground surface. For example, if the minimum distance is approximately zero then the object is positioned along the ground surface and the maximum distance is equal to the height of the object. However, if the minimum distance is greater than zero then the object is offset from the ground surface and the object is overhanging the road. For example, if the minimum distance of the object from the ground places the object above the vehicle (e.g., greater than a threshold distance from the top surface of the vehicle), the vehicle may safely pass under the overhang object. Alternatively, if the maximum distance of the object from the ground places the object below the vehicle (e.g., less than a threshold distance from the bottom surface of the vehicle), the vehicle may safely pass over the ground object. In some cases, the vehicle may also determine a region of the vehicle that aligns with the object (e.g., the wheels v. the chassis). The vehicle may then determine if the object may pass beneath the object based on the intersection of the particular region of the vehicle with the object.

At 910, the vehicle may determine a maximum distance of the object from a surface associated with the side of the planed path of the vehicle (e.g., the right side or left side of the corridor) and a minimum distance of the object from the side surface. In some cases, the vehicle may determine a maximum distance and minimum distance of the object from a vertical surface associated with both side of the corridor. In this manner, the vehicle may determine an encroachment distance of the object from either the right or left side of the corridor into the planned path of the vehicle.

At 912, the vehicle may determine a path of the vehicle based at least in part on the maximum distance from the ground surface, minimum distance from the ground surface, the maximum distance from the side surface, minimum distance from the side surface, the dimensions of the vehicle, and the semantic class of the object. For example, the vehicle may compare the various distances to one or more thresholds (e.g., the pass distance thresholds discussed above with respect to FIGS. 1-7) to determine if the vehicle may safely pass the object. In some cases, the vehicle may also determine a risk of damage to the vehicle based at least in part on the semantic class of the object. For example, if the object is a newspaper that landed in the lane, the risk to damage may be low, and the vehicle may proceed. However, if the object is child's bike, the risk to damage (e.g., either to the object, the bike, or the vehicle) may be high and the vehicle may not proceed.

Figure 10:
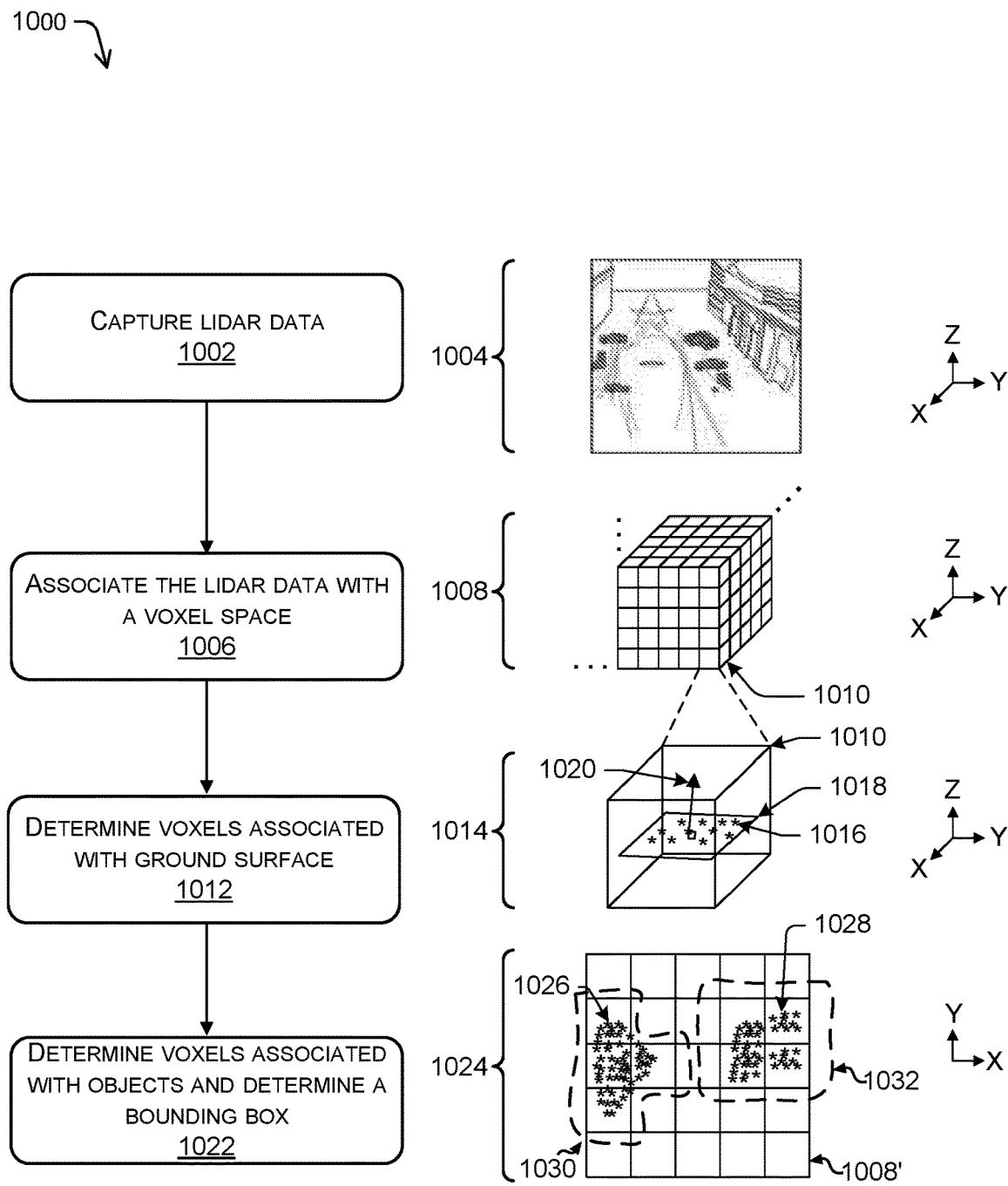
FIG. 10 depicts an example process for detecting the object and determining a surface associated with the planned path of a vehicle.

FIG. 10 depicts an example process for detecting the object and determining a surface associated with the planned path of a vehicle. For example, the vehicle may include one or more lidar device configured to capture a dataset and generate a voxel space, determining voxels that are associated with a ground surface, identify objects, and generate bounding boxes associated with the object.

At 1002, the vehicle may capture lidar data. In some instances, the vehicle may receive a plurality of lidar points from a plurality of lidar sensors operating in connection with a perception system of the autonomous vehicle. In some instances, the data may be combed or fused from two or more lidar sensors into a single lidar dataset representative of a physical environment 1004.

At 1006, the vehicle may associate the lidar data with a voxel space. For instance, example 108 illustrates a voxel space including five voxels in each dimension (e.g., x, y, z), although any number of voxels may be included in the voxel space. In some instances, the voxel space may correspond to a physical environment, such as an area around an origin or a virtual origin of the lidar dataset. For example, the voxel space may represent an area 10 meters wide, 10 meters long, and 10 meters high. Further, each voxel (e.g., a voxel 1010) in the voxel space may represent a physical area, such as 25 centimeters in each dimension. As may be understood in the context of this disclosure, the voxel space may represent any area of an environment, and individual voxels may represent any volume as well. In some instances, voxels may be a uniform size throughout the voxel space, while in some instances, a volume of a voxel may vary based on a location of the voxel relative to an origin of the data. For example, as the density of lidar data may decrease as a distance from a lidar sensor increases, the size of a voxel in a voxel space may increase in proportion to a distance from the voxel to a lidar sensor (or an origin representing a plurality of lidar sensors).

In some instances, the vehicle may map individual points of the point cloud to individual voxels. In some instances, the operation 106 can include subtracting a motion vector associated with the lidar data, for example, in an event that the lidar data is captured by a moving platform, such as an autonomous vehicle, to convert the lidar data to a stationary reference point, for example. That is, in some instances, the lidar data may be associated with a voxel space that is fixed with respect to a global map, for example (e.g., in contrast to a voxel space fixed with respect to a moving vehicle). In some instances, at 1006 the vehicle may discard or omit voxels that do not include data, or that include a number of points below a threshold number, in order to create a sparse voxel space. Further, in some instances, the operation 106 can include aligning a pose of the vehicle (e.g., an orientation of the vehicle) and associated lidar data with the voxel map, for example, to compensate or adjust for any error associated with a position of the vehicle with respect to the voxel space.

At 1012, the vehicle may determine one or more voxels associated with a ground surface. In some instances, the ground surface may correspond to a surface that is drivable by an autonomous vehicle, as discussed above. As shown in 114, a single voxel, for example voxel 1010, is shown including lidar data 1016 that may represent a statistical accumulation of data including a number of data points, an average intensity, an average x-value, an average y-value, an average z-value, and a covariance matrix based on the lidar data. In such instances, though lidar data 1016 is depicted in as a number of points for illustrative purposes, each voxel 1010 may only store the statistical accumulation of those points. In some instances, at 1012 the vehicle may fit a plane 1018 to the lidar data 1016, which may include determining a planar approximation of the lidar data 1016 (e.g., based at least in part on the covariance matrix, e.g., by performing an Eigenvalue decomposition or principle component analysis on the covariance matrix). For example, the vehicle may include performing a principal component analysis, or eigenvalue decomposition, on the lidar data 1016 represented in the voxel 1010 to fit the plane 1018 to the data 1016. In some instances, the vehicle may include determine a planar approximation of the lidar data 1016 represented in the voxel 1010 at least in part on data associated with neighboring voxels to the voxel 1010. The vehicle may also determine a normal vector 1020 associated with the surface 1018. Further, the vehicle may determine a reference direction, which may correspond to an orientation of an autonomous vehicle and may include determining whether the normal vector 1020 is within a threshold amount or orientation with respect to the reference direction (such as to assist with orientation of a vertical surface or plane).

As a non-limiting example, determining a ground surface may include determining an inner product between a vector in the height dimension (e.g., a reference direction) of an apparatus carrying such a lidar system, and the normal vector 120, expressed in a common coordinate system. In such an example, the inner product exceeding a threshold of 15 degrees may indicate that the voxel 1010 does not comprise the ground surface. Further, the vehicle may cluster voxels that are determined to be locally flat voxels to grow a surface corresponding to the ground.

At 1022, the vehicle may determine voxels associated with objects and identify a bounding box 1032. In some instances, the vehicle receives or determine the indication of the ground surface or plane and/or voxels that correspond to a ground surface and removing the subset of voxels associated with the ground surface. Following this removing operation, voxels that remain in the voxel space may represent objects within the planned path of the vehicle. As shown in 124 a view representation of the voxel space 1008', which may correspond to the voxel space illustrated in the 1008. In some instances, the voxel space 1008' includes lidar data 1026 representing a first object and 1028 representing a second object in the path of the vehicle. In some instances, at 1022 the vehicle may cluster data points to determine that the lidar data is associated with an object represented by bounding box 1030, and to determine that the lidar data points 1028 are associated with an object represented by bounding box 1032. Additional details of such ground plane detection and object segmentation is detailed in U.S. patent application Ser. No. 15/622,905 incorporated by reference above.

Figure 11:
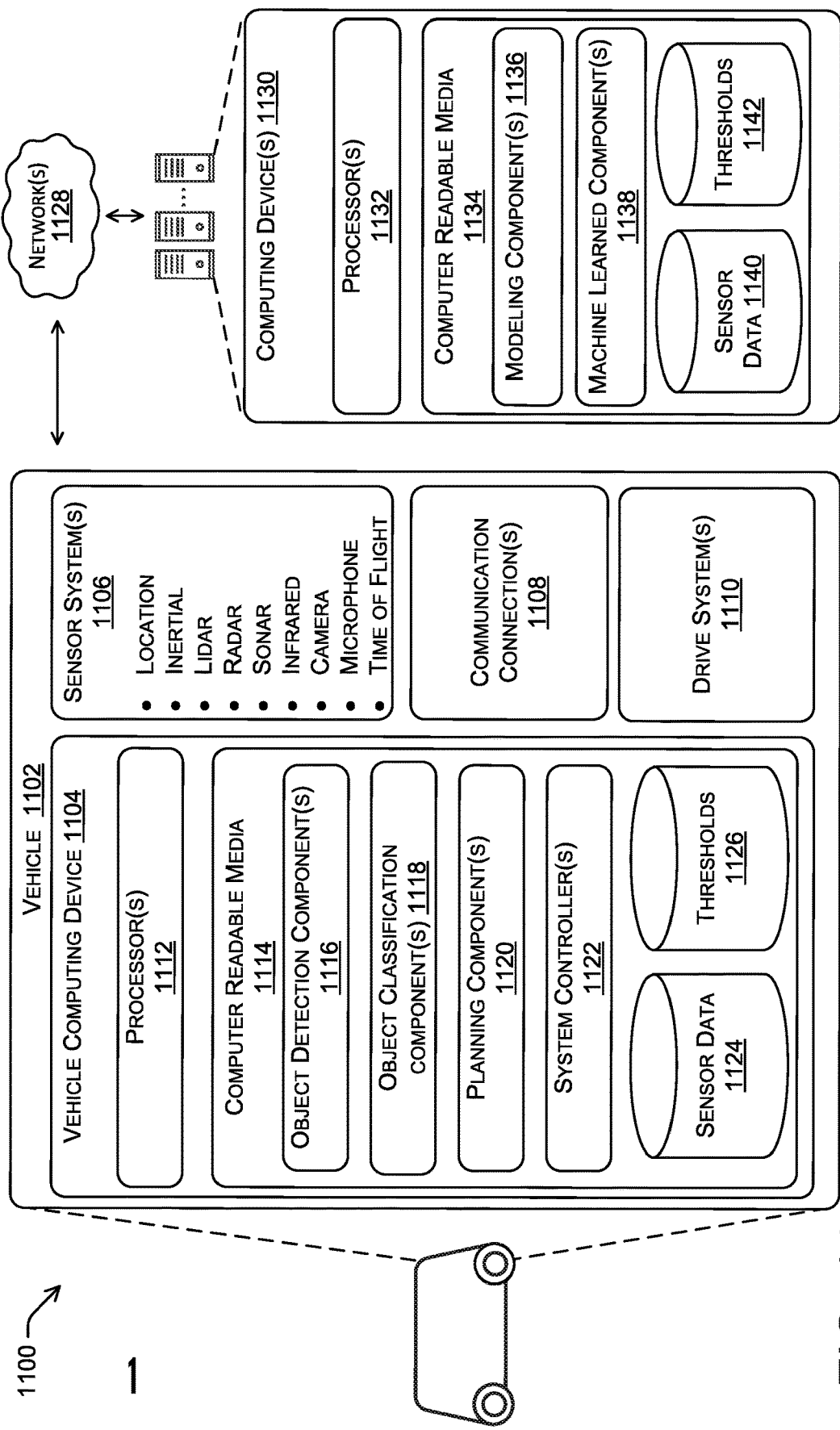
FIG. 11 is a block diagram of an example system for implementing the techniques described herein, in accordance with embodiments of the disclosure.

FIG. 11 is a block diagram of an example system 1100 for implementing the techniques described herein, in accordance with embodiments of the disclosure. In some examples, the system 1100 may include one or multiple features, components, and/or functionality of embodiments described herein with reference to FIGS. 1-9. In some embodiments, the system 1100 may include a vehicle 1102. The vehicle 1102 may include a vehicle computing device 1104, one or more sensor systems 1106, one or more communication connections 1108, and one or more drive systems 1110.

The vehicle computing device 1104 may include one or more processors 1112 and computer readable media 1114 communicatively coupled with the one or more processors 1112. In the illustrated example, the vehicle 1102 is an autonomous vehicle; however, the vehicle 1102 could be any other type of vehicle, or any other system (e.g., a robotic system, a camera enabled smartphone, etc.). In the illustrated example, the computer readable media 1114 of the vehicle computing device 1104 stores object detection components 1116, object classification components 1118, planning components 1120, one or more system controllers 1122 as well as sensor data 1124 and various thresholds 1126. Though depicted in FIG. 11 as residing in computer readable media 1114 for illustrative purposes, it is contemplated that the object detection components 1116, the object classification components 1118, the planning components 1120, the one or more system controllers 1122 as well as the sensor data 1124 and the thresholds 1126, may additionally, or alternatively, be accessible to the vehicle 1102 (e.g., stored on, or otherwise accessible by, computer readable media remote from the vehicle 1102).

In at least one example, the object detection components 1116 may be configured to perform techniques such as object detection, filtering, segmentation, pattern detection, white space detection, pixel correlation, feature mapping, etc. to identify the object from the sensor data and position the object with respect to a map or scene of the physical environment. In some cases, the object detection components 1116 may utilize machine learned models and/or neural networks that may generate any number of learned inferences or heads.

The object classification components 1118 may be configured to estimate current, and/or predict future, characteristics or states of objects (e.g., vehicles, pedestrians, animals, etc.), including pose, speed, trajectory, velocity, yaw, yaw rate, roll, roll rate, pitch, pitch rate, position, acceleration, or other characteristics (e.g., hardness, rigidity, depth, volume, etc.), based at least in part on the sensor data and the outputs of the object detection components 1116.

The planning system 1120 may determine a path for the vehicle to follow to traverse through the physical environment. For example, the planning system 1120 may determine various routes and trajectories and various levels of detail. For example, the planning system 1120 may determine a route to travel around an object within a planned path of a vehicle based on various criteria such as the semantic class of the object, object distance from the ground surface, object height, object width, etc. In some cases, a route may include a sequence of waypoints for travelling around the object or between two physical locations.

In at least one example, the vehicle computing device 1104 can include one or more system controllers 1122, which can be configured to control steering, propulsion, braking, safety, emitters, communication, and other systems of the vehicle 1102. These system controller(s) 1122 may communicate with and/or control corresponding systems of the drive system(s) 1110 and/or other components of the vehicle 1102.

In at least one example, the sensor system(s) 1106 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), and one or more time of flight (ToF) sensors, etc. The sensor system(s) 1106 can include multiple instances of each of these or other types of sensors. For instance, the lidar sensors may include individual lidar sensors located at the corners, front, back, sides, and/or top of the vehicle 1102. As another example, the camera sensors can include multiple cameras disposed at various locations about the exterior and/or interior of the vehicle 1102. The sensor system(s) 1106 may provide input to the vehicle computing device 1104. Additionally, or alternatively, the sensor system(s) 1106 can send sensor data, via the one or more networks 1128, to the one or more computing device(s) at a particular frequency, after a lapse of a predetermined period of time, in near real-time, etc.

The vehicle 1102 can also include one or more communication connection(s) 1108 that enable communication between the vehicle 1102 and one or more other local or remote computing device(s). For instance, the communication connection(s) 1108 may facilitate communication with other local computing device(s) on the vehicle 1102 and/or the drive system(s) 1110. Also, the communication connection(s) 1108 may allow the vehicle 1102 to communicate with other nearby computing device(s) (e.g., other nearby vehicles, traffic signals, etc.). The communications connection(s) 1108 also enable the vehicle 1102 to communicate with remote teleoperations computing device(s) or other remote services.

The communications connection(s) 1108 may include physical and/or logical interfaces for connecting the vehicle computing device 1104 to another computing device (e.g., computing device(s) 1130) and/or a network, such as network(s) 1128. For example, the communications connection(s) 1108 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 1102 can include one or more drive systems 1110. In some examples, the vehicle 1102 may have a single drive system 1110. In at least one example, if the vehicle 1102 has multiple drive systems 1110, individual drive systems 1110 can be positioned on opposite ends of the vehicle 1102 (e.g., the front and the rear, etc.). In at least one example, the drive system(s) 1110 can include one or more sensor systems 1106 to detect conditions of the drive system(s) 1110 and/or the surroundings of the vehicle 1102, as discussed above. By way of example and not limitation, the sensor system(s) 1106 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 1110. In some cases, the sensor system(s) 1106 on the drive system(s) 1110 can overlap or supplement corresponding systems of the vehicle 1102.

In at least one example, the components discussed herein can process sensor data 1124, as described above, and may send their respective outputs, over the one or more network(s) 1128, to one or more computing device(s) 1130. In at least one example, the components discussed herein may send their respective outputs to the one or more computing device(s) 1130 at a particular frequency, after a lapse of a predetermined period of time, in near real-time, etc.

In some examples, the vehicle 1102 can send sensor data to one or more computing device(s) 1130 via the network(s) 1128. In some examples, the vehicle 1102 can send raw sensor data 1124 to the computing device(s) 1130. In other examples, the vehicle 1102 can send processed sensor data 1124 and/or representations of sensor data (for instance, the object perception tracks) to the computing device(s) 1130. In some examples, the vehicle 1102 can send sensor data 1124 to the computing device(s) 1130 at a particular frequency, after a lapse of a predetermined period of time, in near real-time, etc. In some cases, the vehicle 1102 can send sensor data (raw or processed) to the computing device(s) 1130 as one or more log files.

The computing device(s) 1130 may include processor(s) 1132 and computer readable media 1134, storing modeling components 1136, machine learning components 1138, as well as sensor data 1140 and thresholds 1142. For example, the modeling components 1136 and the machine learning components 1138 may generate the thresholds 1142 (such as the pass distance thresholds of FIGS. 1-7 for different velocity and/or classes of objects) using the sensor data 1140 received from one or more vehicles 1102. For instance, the modeling components 1136 and the machine learning components 1138 may label data representative of an object with one or more measured parameters or characteristics of the object in the image. The modeling components 1136 and the machine learning components 1138 may then use the labeled data to train the machine learning models usable to predict motion states of predict current or future speed, trajectory, and/or any other characteristics of objects based on pose of the object depicted in image data.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 1112 of the vehicle 1102 and the processor(s) 1132 of the computing device(s) 1130 may be any suitable processor capable of executing instructions to process data and perform operations as described herein. By way of example and not limitation, the processor(s) 1112 and 1132 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

Computer readable media 1114 and 1134 are examples of non-transitory computer-readable media. The computer readable media 1114 and 1134 can store an operating system and one or more software applications, instructions, programs, and/or data to implement the methods described herein and the functions attributed to the various systems. In various implementations, the computer readable media can be implemented using any suitable computer readable media technology, such as static random-access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 11 is illustrated as a distributed system, in alternative examples, components of the vehicle 1102 can be associated with the computing device(s) 1130 and/or components of the computing device(s) 1130 can be associated with the vehicle 1102. That is, the vehicle 1102 can perform one or more of the functions associated with the computing device(s) 1130, and vice versa. Further, aspects of machine learning component 1138 can be performed on any of the devices discussed herein.

Example Clauses

A. A vehicle comprising: a sensor; one or more processors; one or more computer-readable media storing instructions executable by the one or more processors, wherein the instructions, when executed, cause the vehicle to perform operations comprising: causing the vehicle to traverse a planned path; receiving sensor data from the sensor; determining, based at least in part on the sensor data, an object intersects the planned path; determining a surface associated with the ground; determine a minimum distance of the object from the surface and a maximum height of the object from the surface; determine, based on one or more of the minimum distance or maximum height, a region surrounding the vehicle; and controlling operations of the vehicle based at least in part on the region.

B. The system of paragraph A, wherein determining the surface associated with the ground comprises: associating the sensor data with a voxel space; determining one or more voxels associated with the ground; and fitting a plane to the one or more voxel s.

C. The system of paragraph BA, wherein the region includes at least a first region and a second region, the first region defining a first distance from the vehicle and the second region defining a second distance from the vehicle, the first distance different than the second distance and wherein the controlling operations of the vehicle comprises applying a first set of operating parameters when on one or more of the minimum distance or maximum height protrudes within the first region and a second set of operating parameters when on one or more of the minimum distance or maximum height protrudes within the second region.

D. The system of paragraph A, further comprising: determining, based at least in part on the sensor data, a semantic class of the object; determining the semantic class meets or exceeds a semantic class criterion; and wherein controlling the operations of the vehicle is further based at least in part on the semantic class.

E. A method comprising: receiving from a sensor of an autonomous vehicle data representative of a physical environment; determining, based at least in part on the data, at least a portion of a representation of an object is within a planned path of the vehicle; determining, based at least in part on the data, a surface associated with the planned path; determining a distance associated with the object and the surface; determining a first region associated with the vehicle based at least in part on the distance, the first region intersecting at least a portion of a representation of the object; controlling operations of the vehicle based at least in part on the first region.

F. The method of paragraph E, further comprising: determining a semantic class of the object; and wherein controlling the operations of the vehicle is further based at least in part on the semantic class.

G. The method of paragraph E, further comprising: determining a second region associated with the vehicle based at least in part on the distance, the second region failing to intersect with the object and the second region contained within the first region; and wherein controlling the operations of the vehicle based at least in part on the second region.

H. The method of paragraph E, wherein the first region is determined based at least in part on a velocity of the vehicle.

I. The method of paragraph E, wherein the surface is at least one of a ground surfaces or a side surface of a corridor associated with the planned path of the vehicle.

J. The method of paragraph E, wherein controlling operations of the vehicle is further based at least in part on a distance of the first region from the vehicle and an amount of traffic in an adjacent lane.

K. The method of paragraph E, wherein controlling the operations of the vehicle comprise adjusting a velocity of the vehicle based at least in part on a distance of the first region from the vehicle.

L. The method of paragraph E, wherein the first region is defined as a predetermined distance from a closest point along an exterior surface of the vehicle.

M. The method of paragraph E, wherein the distance is at least one of a maximum height of the object or a minimum distance of the object from the surface.

N. A non-transitory computer-readable medium storing instructions that, when executed, cause one or more processors to perform operations comprising: receiving from a sensor of an autonomous vehicle data representative of a physical environment; determining, based at least in part on the data, at least a portion of a representation of an object is within a planned path of the vehicle; determining, based at least in part on the data, a surface associated with the planned path; determining a distance associated with the object and the surface; determining a plurality of regions associated with the vehicle; determining at least a first region of the plurality of regions intersects at least a first portion of a representation of the object based at least in part on the distance; controlling operations of the vehicle based at least in part on the first region.

O. The non-transitory computer-readable medium of paragraph N, the operations further comprising: determining at least a second region of the plurality of regions intersects at least a second portion of the representation of the object based at least in part on the distance; and wherein controlling the operations of the vehicle based at least in part on the second region.

P. The non-transitory computer-readable medium of paragraph N, wherein determining the surface associated with the planned path comprises: associating the data representative of the physical environment with a voxel space; determining one or more voxels associated with a ground of the physical environment; and fitting a plane to the one or more voxels.

Q. The non-transitory computer-readable medium of paragraph N, the operations further comprising: determining a semantic class of the object; and wherein controlling the operations of the vehicle based at least in part on the semantic class.

R. The non-transitory computer-readable medium of paragraph Q, wherein the semantic class is at least one of a pedestrian, walls or structures, foliage, rocks, vegetation, vehicles, vehicle doors, debris or clutter, bikes, or traffic signals or cones.

S. The non-transitory computer-readable medium of paragraph N, wherein the distance comprises a maximum height of the object from the surface and a minimum distance of the object from the surface and determining at least the first region of the plurality of regions intersects at least the first portion of the representation of the object includes at least one of the maximum height being less than a first threshold associated with a bottom surface of the vehicle or the minimum distance being greater than a second threshold associated with a top of the vehicle.

T. The non-transitory computer-readable medium of paragraph N, wherein the representation of the comprises a bounding box, and wherein determining the one or more of the first region or the second region comprises determining a distance between a corner of the bounding box and the surface.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
   a sensor;
   one or more processors;
   one or more computer-readable media storing instructions executable by the one or more processors, wherein the instructions, when executed, cause the vehicle to perform operations comprising:
   causing the vehicle to traverse a planned path;
   receiving sensor data from the sensor;
   determining, based at least in part on the sensor data, an object intersects the planned path;
   determining a surface associated with a ground;
   determine a minimum distance of the object from the surface and a maximum height of the object from the surface;
   determine, based on one or more of the minimum distance or maximum height, a region surrounding the vehicle; and
   controlling operations of the vehicle based at least in part on the region, wherein controlling operations of the vehicle is further based at least in part on a distance of the region from the vehicle and an amount of traffic in an adjacent lane.

2. The vehicle of claim 1, wherein determining the surface associated with the ground comprises:
   associating the sensor data with a voxel space;
   determining one or more voxels associated with the ground; and
   fitting a plane to the one or more voxels.

3. The vehicle of claim 2, wherein the region includes at least a first region and a second region, the first region defining a first distance from the vehicle and the second region defining a second distance from the vehicle, the first distance different than the second distance and wherein controlling the operations of the vehicle comprises applying a first set of operating parameters when on one or more of the minimum distance or the maximum height protrudes within the first region and a second set of operating parameters when one or more of the minimum distance or the maximum height protrudes within the second region.

4. The vehicle of claim 1, further comprising:
determining, based at least in part on the sensor data, a semantic class of the object; and
determining the semantic class meets or exceeds a semantic class criterion,
wherein controlling the operations of the vehicle is further based at least in part on the semantic class.

5. A method comprising:
receiving from a sensor of an autonomous vehicle data representative of a physical environment;
determining, based at least in part on the data, at least a portion of a representation of an object is within a planned path of the vehicle;
determining, based at least in part on the data, a surface associated with the planned path;
determining a distance associated with the object and the surface;
determining a first region associated with the vehicle based at least in part on the distance, the first region intersecting at least a portion of the representation of the object; and
controlling operations of the vehicle based at least in part on the first region, wherein controlling operations of the vehicle is further based at least in part on a distance of the first region from the vehicle and an amount of traffic in an adjacent lane.

6. The method of claim 5, further comprising:
determining a semantic class of the object; and
wherein controlling the operations of the vehicle is further based at least in part on the semantic class.

7. The method of claim 5, further comprising:
determining a second region associated with the vehicle based at least in part on the distance, the second region failing to intersect with the object and the second region contained within the first region; and
wherein controlling the operations of the vehicle is further based at least in part on the second region.

8. The method of claim 5, wherein the first region is determined based at least in part on a velocity of the vehicle.

9. The method of claim 5, wherein the surface is at least one of a ground surface or a side surface of a corridor associated with the planned path of the vehicle.

10. The method of claim 5, wherein controlling the operations of the vehicle comprise adjusting a velocity of the vehicle based at least in part on the distance of the first region from the vehicle.

11. The method of claim 5, wherein the first region is defined as a predetermined distance from a closest point along an exterior surface of the vehicle.

12. The method of claim 5, wherein the distance is at least one of a maximum height of the object or a minimum distance of the object from the surface.

13. A non-transitory computer-readable medium storing instructions executable by one or more processors, wherein the instructions, when executed, cause the one or more processors to perform operations comprising:
receiving from a sensor of an autonomous vehicle data representative of a physical environment;
determining, based at least in part on the data, at least a portion of a representation of an object is within a planned path of the vehicle;
determining, based at least in part on the data, a surface associated with the planned path;
determining a distance associated with the object and the surface;
determining a plurality of regions associated with the vehicle;
determining at least a first region of the plurality of regions intersects at least a first portion of the representation of the object based at least in part on the distance; and
controlling operations of the vehicle based at least in part on the first region, wherein controlling operations of the vehicle is further based at least in part on a distance of the first region from the vehicle and an amount of traffic in an adjacent lane.

14. The non-transitory computer-readable medium of claim 13, further comprising:
determining at least a second region of the plurality of regions intersects at least a second portion of the representation of the object based at least in part on the distance, wherein controlling the operations of the vehicle is further based at least in part on the second region.

15. The non-transitory computer-readable medium of claim 13, wherein determining the surface associated with the planned path comprises:
associating the data representative of the physical environment with a voxel space;
determining one or more voxels associated with a ground of the physical environment; and
fitting a plane to the one or more voxels.

16. The non-transitory computer-readable medium of claim 13, the operations further comprising:
determining a semantic class of the object; and
wherein controlling the operations of the vehicle is further based at least in part on the semantic class.

17. The non-transitory computer-readable medium of claim 16, wherein the semantic class is at least one of a pedestrian, walls or structures, foliage, rocks, vegetation, vehicles, vehicle doors, debris or clutter, bikes, or traffic signals or cones.

18. The non-transitory computer-readable medium of claim 13, wherein the distance associated with the object and the surface comprises a maximum height of the object from the surface and a minimum distance of the object from the surface and determining at least the first region of the plurality of regions intersects at least the first portion of the representation of the object includes at least one of the maximum height being less than a first threshold associated with a bottom surface of the vehicle or the minimum distance being greater than a second threshold associated with a top of the vehicle.

19. The non-transitory computer-readable medium of claim 13, wherein the representation of the object comprises a bounding box, and wherein determining at least the first region of the plurality of regions intersects at least the first portion of the representation of the object comprises determining a distance between a corner of the bounding box and the surface.

20. The non-transitory computer-readable medium of claim 13, wherein controlling the operations of the vehicle comprises adjusting a velocity of the vehicle based at least in part on a the distance of the first region from the vehicle.

* * * * *